US006805825B1

(12) United States Patent
MacLeod

(10) Patent No.: US 6,805,825 B1
(45) Date of Patent: Oct. 19, 2004

(54) MANUFACTURE OF FOOTWEAR

(76) Inventor: Norman William MacLeod, 28 Bellevue Crescent, Preston, Victoria, 3072 (AU)

( * ) Notice: Subject to any disclaimer, the term of this patent is extended or adjusted under 35 U.S.C. 154(b) by 0 days.

(21) Appl. No.: 09/581,978

(22) PCT Filed: Dec. 22, 1998

(86) PCT No.: PCT/AU98/01070

§ 371 (c)(1),
(2), (4) Date: Aug. 21, 2000

(87) PCT Pub. No.: WO99/32276

PCT Pub. Date: Jul. 1, 1999

(30) Foreign Application Priority Data

Dec. 22, 1997 (AU) .............................................. PP1053
Aug. 19, 1998 (AU) .............................................. PP5317

(51) Int. Cl.[7] ............................................. B29D 31/50
(52) U.S. Cl. ....................... 264/244; 264/259; 264/275; 264/327; 264/250; 425/119
(58) Field of Search ................................ 264/244, 259, 264/275, 327, 250; 425/119

(56) References Cited

U.S. PATENT DOCUMENTS

| 2,878,523 | A | * | 3/1959 | Hardy ......................... 264/244 |
| 3,199,149 | A | | 8/1965 | Croyle |
| 3,441,643 | A | * | 4/1969 | Tusa et al. .................... 264/244 |
| 3,574,895 | A | | 4/1971 | McIlvin .......................... 18/30 |
| 3,676,542 | A | | 7/1972 | Maltby ......................... 264/244 |
| 5,714,098 | A | | 2/1998 | Potter .......................... 264/40.1 |
| 5,955,017 | A | * | 9/1999 | Foffano et al. ............. 264/161 |

FOREIGN PATENT DOCUMENTS

| AU | 202676 | 11/1954 |
| AU | 230556 | 1/1959 |
| AU | 237735 | 1/1961 |
| AU | 274254 | 10/1964 |
| AU | 281421 | 5/1965 |
| AU | 460543 | 4/1972 |
| FR | 1390965 | 12/1963 |
| GB | 688879 | 3/1953 |
| GB | 1009133 | 11/1965 |

OTHER PUBLICATIONS

European Search Report for European Application No. EP 98 96 0927 (3 pages).

* cited by examiner

Primary Examiner—Edmund H. Lee
(74) Attorney, Agent, or Firm—Wolf, Greenfield & Sacks, P.C.

(57) ABSTRACT

The present invention relates to a method and apparatus for making an item of footwear (2) and to a last (5) to be used in that method and apparatus. The last (5) includes a body (8) which mimicks the general shape of a foot around which an upper (3) for the item of footwear (2) is formed. The last body (8) has a base (9) corresponding to a sole of the general foot shape and the base is adapted to be heated to facilitate moulding of a rubber sole (4) to the upper (3) while the upper is still positioned on the forming last (5). The last preferably has heating means (16) located inside.

9 Claims, 4 Drawing Sheets

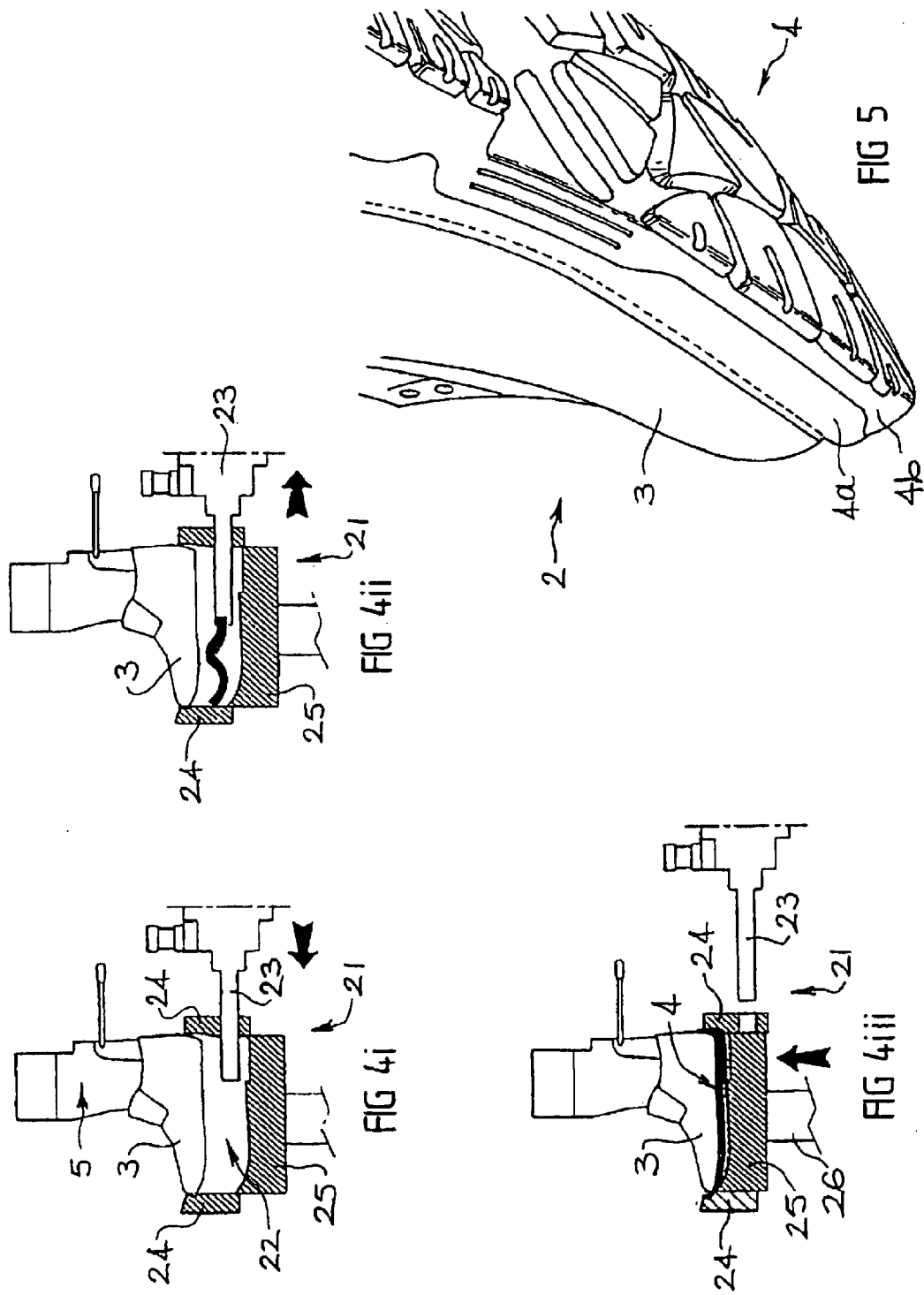

MANUFACTURE OF FOOTWEAR

TECHNICAL FIELD

The present invention relates to the manufacture of footwear. More specifically this invention relates to the moulding of a sole onto the formed upper of an item of footwear such as a shoe or boot.

BACKGROUND ART

Many boots and shoes have an upper formed from a flexible sheet material such as imitation leather or real leather, with a base of the upper mounted on a sole moulded from a polymer plastic or rubber material. The use of synthetic materials in the manufacture of soles for boots and shoes is already well established. PVC, polyurethane, EVA and thermoplastic rubber have all been used to fulfil this purpose. These synthetic materials have suitable functional properties and are aesthetically pleasing as well as being comfortable. Rubber, however, is particularly sought after because of its durability, its resistance to hydrolysis and bacterial attack and its thermal resistance.

During the production process the upper is typically formed around a forming last in a first manufacturing step and then the sole is injection moulded onto a base (i.e. insole) of the upper in a second manufacturing step. The forming last provides a template for the three-dimensional size and shape of the upper. Accordingly, the first step involves mainly shaping and stitching operations. As there is generally no heating involved in this step the last can be made from a variety of materials. Wood and metal have traditional been used, and more recently plastic. Plastic is particularly preferred in lasts today because it is easy to form into the desired shape and is also relatively inexpensive.

The second manufacturing step of the production process involves the injection moulding of the sole onto the base of the upper. As mentioned above, several synthetic materials have been known to be used for the sole. Rubber, however, is seen as being particularly attractive and so-called twin density rubber soles are particularly desirable because they provide a tough out-sole and a resilient mid-sole. Twin density rubber soles therefore provide a durable wear surface at the outsole while maintaining cushioned comfort for the wearer with the resilient mid-sole. Expanded vulcanised rubber in the mid-sole contains cavities or cells (either open or closed) which give the mid-sole its desired level of resilience.

The moulding of rubber soles is an endothermic process and it is therefore necessary to supply generous amounts of heat to the mould. That is, the parts of a mould for a rubber sole must be heated to the appropriate. moulding temperature as the sole is being formed. Because of this necessity to supply heat to the mould, the production process for such rubber-soled footwear has up to now required labour-intensive transfer of the formed upper from the forming last to an injection moulding assembly at which the second manufacturing step could take place. That is, after the first step during which the upper is formed by shaping and stitching on the forming last, the upper is physically transferred from the forming last to a second heated last at the moulding assembly.

This intermediate step of transferring the upper from the forming last to the injection moulding assembly, however, has the disadvantage that it is very labour intensive and can easily add 25% to the manufacturing cost for a pair of shoes. A further disadvantage is that mistakes can occur when placing a lasted shoe on the injection moulding assembly. That is, pre-roughened and/or pre-cemented uppers may be incorrectly placed or aligned, potentially causing a problem with the bonding of the sole to the upper. Not only may this create an unsatisfactory product but it may also delay production while the problem is rectified.

It would therefore be highly desirable to provide a means of integrating the production process steps of forming the upper on the last and moulding the sole onto the upper. This would clearly streamline the production process and reduce the production costs.

SUMMARY OF THE INVENTION

According to an aspect of the present invention there is provided a method of making an item of footwear such as a shoe or a boot, including the steps of:

forming an upper for the item of footwear on a forming last, the forming last including a body having the general shape of a foot around which the upper of the footwear item is to be formed, the body having a base corresponding to a sole of the foot shape; and moulding a rubber sole onto the formed upper while it is still mounted on the forming last, the forming last being heated before and/or during the moulding step, wherein the step of heating the forming last includes heating the base of the last body, whilst substantially preventing the heating of parts of the body other than the base.

Thus, the upper remains mounted on a single last for the entire process, including for the moulding and vulcanisation of the rubber sole on the upper.

As already mentioned, the moulding of rubber is an endothermic process. Therefore, in a preferred form of the present invention the method includes the step of heating the forming last before and/or during the step of moulding the rubber sole onto the formed upper. The forming last typically includes a body mimicking the general shape of a foot, around which body the upper of the item of footwear is formed. Furthermore, the body typically has a base corresponding to a sole of the foot shape. In a preferred form of the invention the step of heating the forming last includes heating the base of the last body.

Desirably, the step of heating the forming last before and/or during the moulding step is by means of a heating device located within the body.

In a preferred form of the present invention the step of moulding the rubber sole includes;

placing the last with the upper thereon adjacent a mould assembly having a plurality of mould parts;

arranging the mould parts adjacent the base of the last and the upper thereon to define a mould cavity for the rubber sole;

injecting rubber into the cavity; and applying heat and pressure to the rubber in the cavity to form the sole in adherence with the upper.

The heat may be applied to the rubber in the cavity by the step of heating the last as well as by heating the plurality of mould parts which define the mould cavity for the rubber sole. Naturally, the moulding of the rubber sole includes this application of heat and pressure to the rubber mixture in order to vulcanise the rubber. The step of moulding the sole may also include a two-step moulding process for producing a twin density rubber sole including a relatively compact rubber out-sole and an expanded rubber mid-sole.

It is to be appreciated that the present invention also extends to an item of footwear made in accordance with the method described above.

According to another aspect of the present invention there is provided an apparatus for making an item of footwear such as a shoe or a boot, including:

a forming last including a body mimicking the general shape of a foot around which an upper of the item of footwear is to be formed, the body having a base corresponding to a sole of the foot shape; and means for moulding a rubber sole onto a formed upper while it is still mounted on the forming last;

the apparatus including means for heating the base of the body of the forming last, and including means for substantially preventing the heating of parts of the body other than the base.

Thus, with the apparatus of the invention it is not necessary to take the shoe or boot upper off the last on which it is formed before the rubber sole can be moulded onto the upper. Rather, the apparatus has means for supplying necessary heat to the forming last to efficaciously mould the rubber sole.

In a preferred form of the invention the means for heating the base of the last body is located within the last. Preferably the base of the last body includes a metallic portion such as one or more metal plate member defining an outer surface of the base to which heat is transmissible from the heating means. The heating means may include one or more electrically activated heating element located inside the last adjacent an inner side of the plate member(s).

In a preferred form of the invention the means for moulding the rubber sole includes:

a mould assembly having a plurality of mould parts to be arranged adjacent the base of the last body, and the upper located thereon, to define a mould cavity for the rubber sole; and an injector for injecting a rubber mixture into the mould cavity.

The mould parts preferably comprise two side parts, a top part formed by the base of the last and a bottom part which is moveable to compress the rubber during the moulding process. As the injection moulding and vulcanisation of the rubber requires substantial heat, the mould assembly also includes means for heating the side parts and the bottom part of the mould assembly. Typically, these mould parts are heated by electric heating elements embedded therein with those mould parts desirably being formed of metal.

In a preferred form of the invention the apparatus also includes a dummy last in addition to the forming last(s) by means of which a compact out-sole may be formed for a two-density rubber sole. Advantageously, the apparatus of the invention also includes a support which is moveable relative to the moulding means, the forming last and the dummy last being mounted on the support spaced apart from each other.

According to a further aspect of the present invention there is provided a last for making an item of footwear such as a shoe or a boot, including a body mimicking the general shape of a foot around which an upper of the item of footwear is to be formed, the body having a base corresponding to a sole of the foot shape and the last further including means for heating the base of the last body, and means for substantially preventing the heating of parts of the body other than the base.

In a preferred form of the invention the means for heating the base of the last body is located within the last and is preferably in the form of one or more electric heating element. The base of the last body may include a metallic portion such as a plate member to which heat is transmissible from the heating means. At least one electrically activated heating element may be located inside the last adjacent an inner surface of the plate member(s). The plate members desirably extend across the base of the last body.

Preferably, the means for substantially preventing the heating of parts of the body other than the base comprising insulation means between the base and the rest of the body.

In a preferred form of the invention the last body includes a recess or cavity for receiving and housing one or more electrically activated heating element adjacent the plate member(s). The body of the last is preferably formed predominantly from a plastic such as polyethylene. The plate member is preferably formed of a material having good thermal conductivity, eg a metal such as aluminium or steel.

The insulation means serve to insulate parts of the body other than the base, such as the non-metallic parts of the body (in the case of a plastic body, for example) from heat generated by the heating element(s).

Furthermore, in a preferred form of the invention the last body comprises two distinct portions; namely, a heel portion and a toe portion. The heel portion and the toe portion are separable from one another to facilitate removal of an item of footwear from the last after the sole has been moulded.

The above and further features and advantages of the present invention will be more fully appreciated from the following detailed description of preferred embodiments of the invention with reference to the accompanying drawings.

BRIEF DESCRIPTION OF THE DRAWINGS

FIGS. 4*i* to 4*iii* are schematic sectioned views of part of the apparatus of FIG. 1 showing the means for injection and compression moulding of a rubber sole to a shoe upper; and FIG. 5 shows an item of footwear made in accordance with the present invention.

DETAILED DESCRIPTION OF PREFERRED EMBODIMENTS OF THE INVENTION

Figure 1:
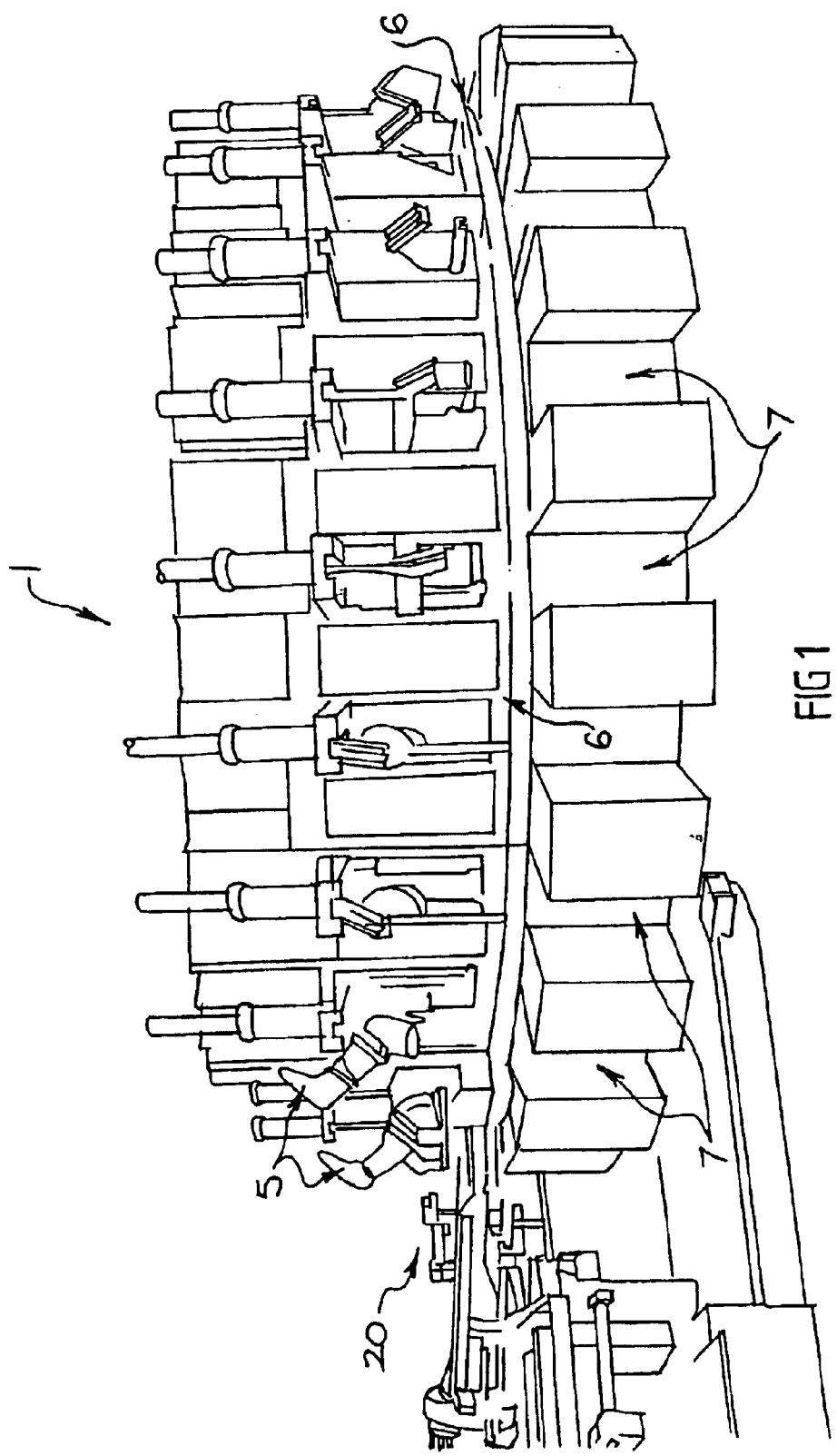
FIG. 1 is a three dimensional view of a rotary apparatus for making shoes in accordance with one embodiment of the invention.

Referring to FIG. 1 of the drawings, the present invention provides an apparatus (1) suitable for manufacturing items of footwear such as shoes and boots having a flexible leather upper and an injection moulded rubber sole. An example of such an item of footwear which may be made with the apparatus (1) is illustrated in FIG. 5. FIG. 5 shows a shoe (2) having a leather upper (3) and a rubber sole (4) comprising an expanded rubber mid-sole 4*a* and a tough rubber outsole 4*b*.

Returning to FIG. 1, the apparatus (1) broadly includes a plurality of lasts (5) mounted in spaced apart relation around the periphery of a turntable (6). A number of stationary workstations (7) complementary to the number of lasts (5) are positioned radially outward of and adjacent to the turntable (6). The lasts (5) move with the turntable sequentially through each of the workstations (7) as the turntable (6) is rotated. The sole of the shoe (2) is progressively formed in discrete fabrication steps on each last (5) as the lasts move sequentially through the separate workstations (7).

Figure 3:
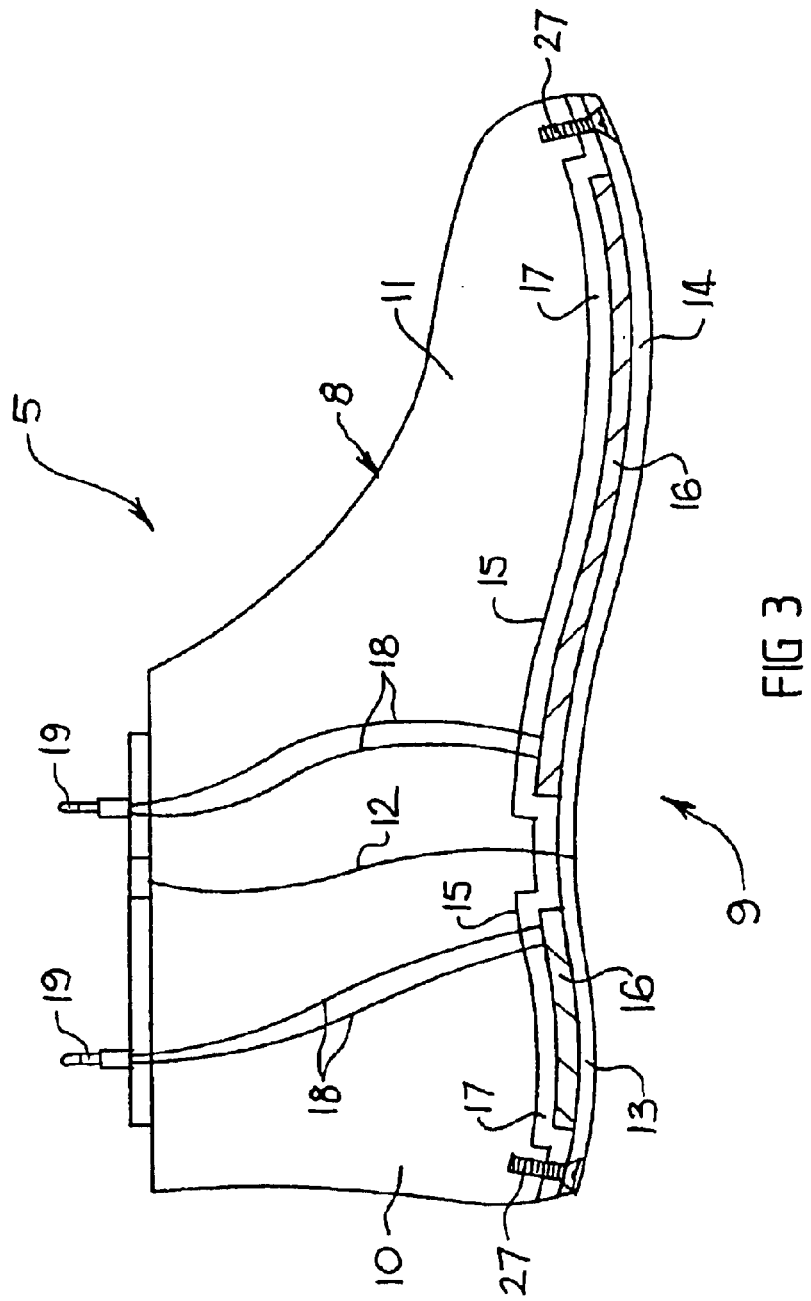
FIG. 3 is a schematic sectioned side view of the forming last of FIG. 2.

With reference to FIG. 3 of the drawings, each last (5) includes a body (8) which mimicks or has the general shape of a foot and provides a template for the shape and size of a particular style shoe; in particular, the upper portion (3) of the shoe. The body (8) of each forming last is formed predominantly of polyethylene since this material is relatively inexpensive and can be readily shaped to a specific last design. The last body (8) has a base (9) which corresponds to a sole of the foot shape that the last body is designed to mimick.

The body (8) of each last (5) includes two discrete parts, namely a heel portion (10) and a toe portion (11) which are separably attached end-to-end along a junction (12) when the last is mounted on the turntable. The base (9) of the last body includes plate members (13,14) which extend over the base in each of the heel and toe portions (10,11) of the last body, respectively. The plate members (13,14) are preferably formed from aluminium which has good thermal conductivity properties. Other metals, however, may be equally suitable. The plate members (13,14) present the outer surface at the base of the last and may be attached to the last body by any suitable fastening, such as screws (27).

The last body (8) also includes a recess (15) for receiving and housing an electrically activated heating element (16) adjacent an inner surface of each of the heel and toe portion base plate members (13,14). The heating elements (16) are in face-to-face contact with the plate members over a substantial proportion of the surface area of those plate members thereby providing direct and effective heat conduction in a substantially uniform manner over the plate members. The recess (15) also includes insulation material (17) provided on the side of the electric heating elements opposite the base plate members (13,14) to thermally shield the polyethylene parts of the heel and toe portions (10,11) from the heat generated by the heating elements. During the moulding of the rubber sole (4) the base plates (13,14) of the forming last are heated in the range of about 100° C. to 120° C., and the heating elements (16) themselves achieve temperatures even higher. The non-metallic parts of the last body must therefore be insulated to prevent their undesirable deformation.

Each of the electric heating elements (16) is electrically connected to an electric power supply. Electric wires or leads (18) extend from each of the elements (16) to terminals (19) at a top surface of the last (5). These terminals (19) are adapted to operate in a male-female bayonet type coupling for connection to the power supply (not shown). When each last (5) is mounted onto the rotatable turntable (6) of the apparatus (1) shown in FIG. 1 the terminals engage in a bayonet type coupling to connect the heating elements to a power supply which will heat the base plate members to appropriate temperature. Each last (5) also includes a thermostat (not shown) to monitor and regulate heating of the plate members (13,14).

The formation or manufacture of an upper (3) for an item of footwear typically involves cutting, shaping, and stitching of a flexible material, such as real or imitation leather, around the body (8) of the forming last (5). The formation of the upper (3) takes place predominantly at room temperature and occurs throughout a series of separate operations at several workstations. Once the shoe upper (3) is completed, the last (5) with the formed upper thereon, is moved to a workstation (20) specifically designed for injection moulding of a rubber sole (4) onto the upper.

Referring to FIGS. 4i to 4iii, the apparatus (1) at the workstation (20) includes a mould assembly (21) having a plurality of mould parts to be arranged adjacent the base of the last (5)—with the upper (3) of the footwear item formed thereon—to define a mould cavity (22) for the rubber sole (4) and an injector (23) for injecting a rubber mixture into the cavity. The structure and function and the injector is known and will therefore not be described in further detail here. The plurality of mould parts include two side mould parts (24) and a bottom part (25). During the moulding process the base of the last body (18) forms a top part of the mould. The bottom part of the mould is operatively attached to a ram (26) which is moveable upwardly into engagement with the rubber mixture during the moulding process to compress it and promote vulcanisation. Typically the ram (26) is hydraulically driven although obviously other means may also be used.

As the vulcanisation of the rubber during the moulding process requires the input of a substantial amount of heat, each of the mould parts (24,25) is heated. The mould parts may be heated by means of electrical heating elements embedded within the mould parts themselves. The mould parts (24, 25) are typically formed of metal to conduct heat to the rubber mixture during the moulding process. It will be appreciated, however, that the mould parts may also be heated by other means.

The sole (4) of the shoe is formed from a rubber mix material which is typically obtained from a specialist rubber supply company. The rubber mix comprises a basic polymer material which is irreversibly transformed from a plastic to an elastic state by a process of vulcanisation. The vulcanisation of the basic polymer material essentially involves three-dimensional cross-linking of the polymer molecules. Vulcanisation is accomplished under specific conditions of elevated temperature and pressure. The rubber mix also includes basic polymer additives including fillers and protective agents.

During the moulding process an appropriate quantity of rubber mix is injected into the mould cavity (22). In the illustrated embodiment the injector (23) actually projects into the cavity and is then withdrawn as the rubber mix material is dispensed. It will be appreciated, however, that other techniques and arrangements can be used. Preferably before the moulding process has begun, the heating elements (16) within the last (5) have been heating the base plate members (13,14) of the last body to the appropriate temperature for moulding the sole. A thermostat operatively associated with the plate members (13,14) maintain the base (9) of the last body at the appropriate temperature throughout the moulding process. Likewise, the side and bottom mould parts (24,25) are heated before and/or during this moulding phase. Thus, after the cavity (22) is injected with the desired quantity of the rubber mix the ram (26) moves the bottom part of the mould upward against the formed upper and the heated base (9) of the last body (8). The rubber mix is therefore vulcanised under heat and pressure to form the sole (4) in adherence with the upper (3). It will be appreciated by persons skilled in the art that the formed upper (3) may undergo a pre-roughening and/or pre-cementing phase prior to the moulding process in order to promote adherence of the moulded sole to the upper.

After the moulding of the sole is completed the shoe (2) is moved on the forming last (5) away from the workstation (20). Removal of the shoe from the last (5) is facilitated by separation of the toe portion (11) from the heel portion (10) of the body (8) along the junction (12).

The sequence of steps illustrated particularly clearly in FIGS. 4i to 4iii represents the manufacture of a single density sole as distinct from a two-density sole referred to earlier. One particularly useful property of rubber is that it can be used to make a two-density rubber sole. That is, a sole for having an expanded rubber mid-sole(4a) and a thin layer of compact rubber which forms an outsole(4b) in two discrete steps. The first step comprises forming the compact rubber outsole and the second step comprising forming the expanded rubber mid-sole.

Figure 2:
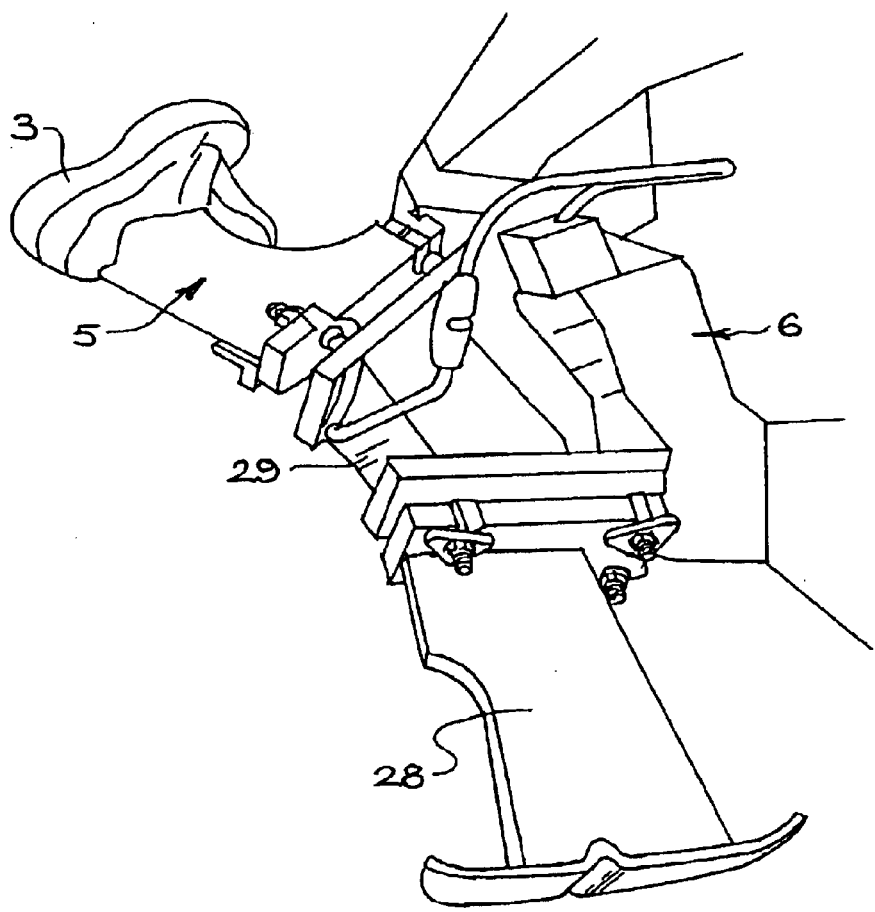
FIG. 2 is a three dimensional view of a forming last and a dummy last mounted on a last support for the apparatus of FIG. 1.

With reference to FIG. 2 of the drawings, the process involves the use of a dummy last (28) for creating the compact rubber outsole while the forming last (5) having the shoe upper (3) thereon is used for moulding the expanded rubber mid-sole.

Each last (5) has an associated dummy last (28) mounted on a common support (29) rotatable on the turntable (6). The support (29) can be moved between a first position in which the dummy last (28) extends into the mould cavity (22) with the last (5) spaced away therefrom and directed upwardly, and a second position in which the last (5) projects into the moulding cavity (22) and the dummy last (28) points upwardly.

In the first step the outsole (4a) is moulded with the dummy last (28) in position in the mould cavity (22). In the second step the mid-sole is formed with the last (5) and the shoe upper (3) in the mould cavity. It is the second step therefore which physically attaches the rubber sole (4) to the fabric base (i.e. insole) of the upper (3).

A major advantage of the method described above is that the lasted upper (3) does not need to be transferred from a last for forming the upper to a vulcanising last designed for the moulding process. Accordingly, the manufacturing process is substantially more streamlined, more efficient and cheaper. The end product is also arguably of superior quality. In the very competitive footwear industry, lower production cost is significant.

Finally, it is to be appreciated that various modifications, alterations and/or additions may be introduced into the construction and arrangement of the parts particularly herein described without departing from the spirit or ambit of the present invention.

What is claimed is:

1. A method of making an item of footwear, the method comprising the steps of:

forming an upper for the item of footwear on a forming last, the forming last including a body having the general shape of a foot around which the upper of the footwear item is formed in a series of separate operations, the last body having a base corresponding to a sole of the foot shape;

providing an apparatus having a plurality of separate workstations for performing discrete footwear fabrication operations, including a moulding workstation for moulding a rubber sole;

removably mounting the forming last on the apparatus and moving the last sequentially through the plurality of separate workstations to complete the upper before moving the last with the formed upper thereon to the moulding workstation; and moulding a rubber sole onto the formed upper while it is still mounted on the forming last, the forming last being heated before and/or during the moulding step, wherein the step of heating the forming last includes heating the base of the last body, whilst substantially preventing the heating of parts of the body other than the base.

2. A method as claimed in claim 1, wherein the step of forming the upper on the last in said series of operations includes providing the upper with a base to which the rubber sole is to be attached.

3. A method as claimed in claim 1, wherein the step of moving the last with the formed upper thereon to a moulding workstation comprises rotating a turntable of the apparatus on which the last has been mounted.

4. A method as claimed in claim 1, wherein:

the base of the last includes at least one metal plate member extending at least partially over the base of the last body to which heat is transmissible from heating means located within the last, such that the step of heating the forming last comprises heating the at least one metal plate member; and the last includes insulation means between the at least one metal plate member and the rest of the last body to substantially prevent heating of parts of the body other than the base.

5. A method as claimed in claim 4, wherein the heating means includes at least one electrically activated heating element located inside the last adjacent an inner surface of said at least one plate member, and the step of heating the base of the last includes activating the at least one heating element.

6. A method as claimed in claim 5, wherein the forming last includes an electric terminal at a top surface thereof for electrically connecting the at least one heating element to a power supply, and wherein the step of mounting the last on the apparatus includes engaging the terminal in a bayonet type coupling to connect the heating elements to the power supply.

7. A method as claimed in claim 1, wherein the last body includes a heel portion and a toe portion, the heel portion and the toe portion being separable from one another, the method including the step of separating the heel portion and the toe portion of the last to facilitate removal of a finished item of footwear.

8. A method as claimed in claim 1, wherein the step of moulding the rubber sole includes:

placing the last with the upper thereon adjacent a mould assembly having a plurality of mould parts;

arranging the mould parts adjacent the base of the last and the upper thereon to define a mould cavity for the rubber sole; injecting rubber into the cavity; and applying heat and pressure to the rubber in the cavity to form the sole in adherence with the upper.

9. A method as claimed in claim 8, including the step of heating the mould parts at least one of before and during formation of the rubber sole to vulcanise the rubber.

* * * * *